US012688877B2

(12) United States Patent (10) Patent No.: US 12,688,877 B2
Röbl et al. (45) Date of Patent: Jul. 21, 2026

(54) METHOD FOR PLACING A PIECE OF PLAYBACK CONTENT WITHIN THE DISPLAY AREA OF A SCREEN OF A VIDEO SHELVING RAIL

(71) Applicant: VusionGroup GmbH, Fernitz-Mellach (AT)

(72) Inventors: Andreas Röbl, Fernitz-Mellach (AT); Thomas Schwarz, Hohberg (DE); Philipp Jauck, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

(21) Appl. No.: 18/700,568

(22) PCT Filed: Oct. 20, 2021

(86) PCT No.: PCT/EP2021/079102
§ 371 (c)(1),
(2) Date: Apr. 11, 2024

(87) PCT Pub. No.: WO2023/066480
PCT Pub. Date: Apr. 27, 2023

(65) Prior Publication Data
US 2024/0428828 A1 Dec. 26, 2024

(51) Int. Cl.
G11B 27/34 (2006.01)
(52) U.S. Cl.
CPC .................................... G11B 27/34 (2013.01)
(58) Field of Classification Search
None
See application file for complete search history.

(56) References Cited

U.S. PATENT DOCUMENTS 10,636,391 B2 4/2020 Yamazaki et al.
2018/0166046 A1* 6/2018 Yamazaki .............. G06Q 30/02

FOREIGN PATENT DOCUMENTS

JP 2018-97462 A 6/2018
JP 2019-96127 A 6/2019
WO 2019/091566 A1 5/2019

OTHER PUBLICATIONS

International Search Report issued in PCT/EP2021/079102; mailed Jul. 7, 2022.

(Continued)

*Primary Examiner* — Girumsew Wendmagegn
(74) *Attorney, Agent, or Firm* — Studebaker Brackett PLLC

(57) ABSTRACT

Method for placing playback content within the display area of a screen of a video shelving rail.
wherein, with the help of a camera, a digital image of the screen and/or a product-presentation area extending along the screen is captured, and
wherein an image-processing device is used to automatically detect a placement indicator and its position in the digital image, wherein the placement indicator indicates or delimits the space of a product to be presented along the screen, and
wherein the image-processing device generates placement data based on the detected position of the placement indicator, wherein the placement data defines the space for the playback content to be played within the display area, and
wherein the video shelving rail displays the playback content in accordance with the placement data within the display area of the screen.

21 Claims, 4 Drawing Sheets

(56)                 References Cited

OTHER PUBLICATIONS

An Office Action; "Notice of Reasons for Refusal," mailed by the Japanese Patent Office on Sep. 17, 2025, which corresponds to Japanese Patent Application No. 2024-518116 and is related to U.S. Appl. No. 18/700,568; with English language translation.

* cited by examiner

METHOD FOR PLACING A PIECE OF PLAYBACK CONTENT WITHIN THE DISPLAY AREA OF A SCREEN OF A VIDEO SHELVING RAIL

TECHNICAL FIELD

The invention relates to a method for placing a piece of playback content within the display area of a screen of a video shelving rail.

BACKGROUND

On today's business premises, product and/or price information is presented on electronic display units, particularly electronic shelf labels, known in technical jargon as electronic shelf labels, or ESLs in short. These physical ESLs are manually attached to a shelving rail, which forms the front end of a shelf, in positions corresponding to products placed on the shelf, and, with their typically electrophoretic screens, essentially display static product and/or price information. Furthermore, a so-called video shelving rail is known from the international patent application with publication number WO 2019/091566 A1, in which a video screen, which forms the front shelving rail end, is used to present video-based information (a video or a video clip), particularly about a product, and to embed virtual ESLs into these video clips and display them corresponding to the positions of the products. The positioning of this virtual ESL is done manually via a remote control, such as a tablet computer.

In the case of physical ESLs, discrepancies between the placement of the respective ESLs and the affected product can only be corrected by manual intervention, i.e., manually moving the ESL. This can easily be done while a staff member wanders through a shelf aisle and visually checks the positioning and intervenes immediately in the event of said deviations. The staff member can easily implement this in an accompanying fashion, i.e., in passing, in addition to his/her primary activities, such as the refinishing of products on the shelving rails.

In the case of virtual ESLs, the adjustment of the placement is not so easy to do because the staff member would always have to carry the remote control with him/her, work his/her way through the menu items when operating the remote control and would have to position the ESL by operating the user interface of the remote control. However, this process would significantly hinder him/her in his/her primary activities, such as the aforementioned product finishing, which is undesirable during the course of operations.

The invention has set itself the task to provide a method in which the mentioned disadvantages are overcome when using video shelving rails.

SUMMARY OF THE INVENTION

This task is solved by means of a method according to claim 1. The object of the invention is therefore a method of placing a piece of playback content within the display area of a screen of a video shelving rail, wherein, with the help of a camera, a digital image of the screen and/or of a product-presentation area extending along the screen is captured, and wherein an image-processing device is used to automatically detect a placement indicator and its position in the digital image, wherein the placement indicator indicates or delimits the space of a product to be presented along the screen, and wherein the image-processing device generates placement data based on the detected position of the placement indicator, wherein the placement data defines the space for the playback content to be played within the display area, and wherein the video shelving rail displays the playback content in accordance with the placement data within the display area of the screen.

The advantages of the measures according to the invention are that, for the first time, automatic placement of the playback content is made possible by automatically determining the placement data, and that completely without the manual intervention of a supermarket staff member. The placement data obtained in this way can be used in various ways for the automatic placement as well as for changing placement, in particular, following a previous placement of the playback content within the display area, which will be discussed in detail below.

The playback content can be available as dynamically changing content, such as a video or a video clip for example, or also by essentially static content, such as product and/or price information presented in a type-safe manner by means of an electronic shelf label for example. The respective type of playback content is represented by playback data, which is processed by an on-screen electronics of the screen of the video shelving rail so that the screen displays the respective playback content at a defined display area position within its display area. Individual playback content can be positioned within the display area at individual display area positions and visually overlap or cover each other. By overlapping a larger playback content with a smaller playback content, a picture-in-picture impression can be created for the viewer. For example, with the help of the video shelving rail, a video can be presented on the one hand and the video can be overlapped by a virtual ESL in a part of the display area on the other. Thereby, for example, an emotionally evoking video can be shown for a product along the entire length of the display area and, with the help of the virtual ESL, matter-of-fact product and/or price information can be displayed at a certain point, more precisely a section within the display area, i.e., within the video. Of course, the display area can also be divided along its length in accordance with the different products along which it extends. Thereby, for example, n videos can be played adjacent to each other for n products, in which the respective virtual ESL belonging to the product is embedded. Also, instead of the essentially static content of the virtual ESL, dynamic content can also be played back there.

Furthermore, particularly favourable embodiments and further embodiments of the invention result from the dependent claims as well as the following description.

The product-presentation area of a shelf is the area where products are presented to customers. These are usually shelving rails that are arranged adjacent to each other or on top of each other in different configurations. The front edges of such shelving rails, which are orientated towards the customer, are bordered by the video shelving rails. However, the product-presentation area can also be understood as an area in which, for example, products hanging adjacent to each other and/or grouped on top of each other in different configurations are presented. Here, for example, the video shelving rails can also be positioned hanging below the hanging products or attached to a structure of the shelf, such as the rear end wall or side partitions or struts for example.

The digital image is represented by image data generated by the camera during video or still image capture of the respective scene in the camera's detection area. This means that the digital image can be given by a digital still image (e.g., in JPG or GIF format, etc.) or also a sequence of digital still images as well as by a digital video (e.g., in MP4 or MOV format, etc.).

The placement indicator, which is recognized fully automatically, can be of a very different nature or also comprise a wide variety of characteristics, which will be discussed in detail below.

The invention discussed here is mainly used in the context of an ESL system with said video shelving rails.

For the purpose of visualizing information, each of the video shelving rails has a video screen. The ESL system comprises a plurality of wireless base stations, also known as access points, each of which supplies groups of video shelving rails with the dynamic and also static playback content that matches the products presented on the shelving rails bordered by the respective video shelving rail.

The radio assignment works by selecting a suitable radio channel in the ISM band used by the respective access point and registering the relevant video shelving rail with the access point responsible for it. For radio communication, an essentially standardized radio protocol, such as ZigBee® or Bluetooth®, or even a WLAN network or also a wired LAN network can be used for example.

The access points, for their part, are typically wired with a higher-level or central control device, such as a local server on which a software application (e.g., shop management software). for example, is run for the administration and control of the ESLs or for defining the visually perceptible playback content of the virtual ESLs, or also a cloud-based software application that supplies the video shelving rails with the playback content and, where applicable, also covers other aspects of merchandise management.

In accordance with the method, the placement indicator and its position are first automatically detected using computerized image content and/or pattern recognition. Software is used that runs on a processor and is optimized to find the placement indicator to be identified, which can comprise a characteristic to be identified, particularly also one that is already known, in the digital image created by the camera.

In accordance with an embodiment type of the method, an optical signal, in particular, a light signal in the spectral range that is not visible to humans, is detected as the placement indicator. This light signal makes it much easier to identify the placement indicator because it can be easily distinguished from the background in terms of its intensity or spectrum and is therefore easier to find in the digital image during a digitized search than is the case with non-luminous objects. In accordance with a special embodiment type, the optical signal can also be located in the part of the spectrum that is not visible to humans, which means that customers who are in the store can no longer perceive it and, therefore, these customers are also not irritated by the optical signal. Of course, the camera is optimized for the wavelength or spectral range of the light signal to be processed.

In particular, the optical signal is formed by a signal that changes in time and/or space. On the one hand, this type of signal can improve the findability in the digital image, because a change in the image content is often easier to detect automatically than a static image content. In addition to the position from which it is emitted, and which is recognized in the image, the optical signal can also be used to transport further information, which can be recorded, for example, in the context of finding the optical signal in the digital image. This additional information can concern, for example, the product that should be present at the position of the optical signal or in its environment.

For example, a time-varying optical signal can be understood as a flashing light signal. This light signal can be emitted by a single light source, for example. A spatially varying optical signal can be understood, for example, as a light signal emitted by different light sources or positions, possibly flashing, i.e., a combination light signal generated by different light sources. A spatially and temporally varying light signal can be understood, for example, as a light point cloud displayed on a screen, which changes over time.

In accordance with one variant, the optical signal can be emitted from the screen. For this purpose, the screen can also comprise a light-emitting diode or similar integrated into its housing or into a frame bordering the display area. The display area of the screen can also be used, for example, to emit a simple static light signal at a certain point, to emit a simple flashing light signal, or also to display a pattern that can change in time and/or space. Such a pattern is particularly suitable for transporting the additional information via appropriate coding. The control of the light-emitting diode or the screen for the purpose of transmitting the optical signal is carried out by the electronics of the video shelving rail. In particular, when using the screen of the video shelving rail to emit the optical signal, the display area can, for example, be segmented in a visibly perceptible along its longitudinal extension and thus display the corresponding presentation segments along the longitudinal extension of the shelf. This can be detected in the digital image of the display area by the image-processing device and can be used to generate such placement data that, for example, the virtual ESLs are placed in the display area of the screen of the video shelving rail corresponding to the centre of the respective presentation segment.

In accordance with embodiment type, the optical signal is emitted by a shelf divider located in the product-presentation area. A shelf divider is an essentially plate-shaped object that is placed on the shelf and spatially separates two products or groups of products that are placed separately by it on its left and right sides. This goes hand in hand with the effect that the playback content displayed with the help of the video shelving rail can be played back undisturbed by the emission of the optical signal. The signalling by the optical signal is spatially separated from the video shelving rail and therefore does not interfere with a customer's perception of the playback content. For this purpose, the shelf divider is equipped with one or a plurality of light-emitting diodes on its front and/or upper housing side or in the intersection area between these two sides of the housing, which are controlled by means of electronics of the shelf divider integrated into the housing. The front side of the housing is the one that faces the area in front of the shelf and is also essentially orientated towards the video shelving rail as well. The upper side of the housing is the one facing away from the shelf on which the products in question are presented. Depending on the configuration of the shelf divider used as well as the spatial conditions of the shelf, the camera must be positioned in such a way that it can detect one or a plurality of light-emitting diodes of the shelf dividers installed in the shelf.

In accordance with another embodiment type, a product or a product group that is located in the product-presentation area is recognized as the placement indicator. The advantage of this embodiment type is that there is no need for signalling by additional light sources or by the screen itself. This reduces the technical as well as investment-related effort on the side of the video shelving rail and, where applicable, also on the side of an optionally provided shelf divider or the like. In the present case, computerized image content and/or pattern recognition is based on the products or product groups that can be found on the shelf by computerized image analysis in order to arrive at the placement data.

In the following, we will discuss how the placement data is used to control the positioning of the playback information.

In accordance with an first embodiment type in the processing of the placement data, the placement data is transferred from the image-processing device to the higher-level control device, wherein the control device controls the placement of the playback content in accordance with the placement data within the display area of the screen of the video shelving rail, in particular, the one from which the digital image was captured, in particular, individually for a plurality of such video shelving rails.

The higher-level control device can be the server, which is housed on the retailer's premises and on which software is processed with which the individual video shelving rails are supplied with playback data. This playback data represents the static and/or also dynamic playback content to be displayed on the respective screen for the entire display area of the screen. This means that a wide variety of individual playback content, taking into account the placement data, are already embedded or also "merged" in the higher-level control device, before the playback data generated in the process is transferred to the video shelving rail and the overall playback content represented by it is visualized with the help of the screen.

However, the higher-level control device can also be available as a cloud-based software solution hosted on a server or with the help of a server farm in a data centre and available to the retailer via the Internet for the aforementioned purposes.

For example, a background video can be played that fills the entire display area, and the virtual price labels associated with the respective products are displayed in the background video corresponding to or adjacent to the positions where different products are placed adjacent to each other on the shelf. The placement of the virtual price labels, which represent the display information to be positioned, within the display area is described here by the placement data and the placement data is used by the control device to place the price tag(s) along the width of the display area.

The higher-level control device transmits the playback data intended for the respective video shelving rail as a data stream to the video shelving rail in order to obtain real-time playback there. The higher-level control device can also transmit the playback data as a one-time data packet to the relevant video shelving rail, where this data packet is stored and continuously played back (i.e., the playback content defined by it in a repetitive manner, e.g., as a locally stored video clip or video film).

Furthermore, for example, the previously mentioned background video can also be spatially segmented along the longitudinal extension of the display area of the screen of the video shelving rail, wherein each video segment forms an individual dynamic playback content for a specific product of the different products presented adjacent to each other on the shelf. The placement of the individual video segments along the width of the display area is described here by the placement data, and the placement data is used by the control device to place the individual video sequences along the width of the display area. The respective width of the display of the individual video sequence can also be set automatically by the control device, taking into account the placement data so that, for example, the entirety of the video segments displayed adjacent to each other fills the entire width of the display area. Dark or colour-highlighted image areas can also be provided between the individual video sequences in order to better distinguish them visually from each other along the width of the display area or to visually delimit them. In this example, virtual price labels can also be placed along the display area, wherein these are placed, centrally for example, within the part of the display area occupied by the respective video segment. In this case, the higher-level control device also uses the placement data either directly to place the virtual price labels or indirectly, i.e., after the video sequences have been placed, in order to then place the virtual price labels with reference to the placed video sequences.

In accordance with a second embodiment type in the processing of the placement data, the placement data is delivered from the image-processing device directly to the video shelving rail from which the digital image of the screen or a product-presentation area extending along the screen was captured, wherein the video shelving rail controls the placement of the playback content in accordance with the placement data within the display area of the screen of the video shelving rail. Here, the functionalities discussed in accordance with the first embodiment type for processing the placement data can also be implemented; however, these are now implemented directly by the electronics of the respective video shelving rails. For this purpose, the background video, the video sequences, if applicable, and also the correct number of virtual shelf labels in digital form are transmitted to the respective video shelving rail by the central control device. In particular, the transmission of the background video as well as the video sequences from the control device to the video shelving rail can be carried out as a continuous video stream or as a completed download, as mentioned above. The transmission of the respective virtual shelf label will be realized as a download in the case of a static virtual shelf label. This does not have to be but can also be the preferred transmission to the video shelving rail for virtual shelf labels with dynamic content. In particular, the second embodiment type has the advantage that the task of placing the respective playback content is decentralized at the respective video shelving rail, i.e., no massive computing power has to be planned for the central control device to be provided for in this regard, and the data traffic between the control device and the video shelving rails is also only limited to the provision/transmission of the respective playback content, where applicable, also to their initial placement. Since the video shelving rails already have a playback capability for videos by definition, it is easy for the electronics installed there, where applicable, as well as the software used there, to execute a powerful software with which the previously discussed placement of both dynamic as well as static playback content can be achieved. In other words, the decentralized digital resources of the video shelving rails, such as memory and computing power, are used in an optimized manner in order not only to achieve pure playback, but also to carry out an automated placement of the playback content to be played. In the case of more extensive installations in large supermarkets, which can comprise a plurality of thousand video shelving rails, this massively relieves the higher-level central control device.

As previously discussed in general terms, the placement data describes a placement within the display area of the video shelving rail. In detail, the placement data can describe or represent a placement in the display area in at least one of the following ways, namely:

a single coordinate to define a position in the display area along a direction. This describes, for example, the placement that has already been mentioned along the length of the display area, which runs parallel to the longitudinal extension of the shelf behind it. In a figurative sense, a coordinate is described along the different products or product groups that can be found along the longitudinal extension of a shelf. Such a specification of placement assumes that all playback content is placed, for example, at the lower edge of the display area or at a fixed distance from it or categorized into different groups (dynamic/static or video/label) at a different distance from the lower display area.

a pair of coordinates to define a position of a point in the display area. The use of a pair of coordinates allows for complete flexibility of placement in relation to the edges of the display area. For example, a piece of playback content can now be placed arbitrarily within the display area.

a route within the display area. Specifying a route also makes it possible to scale the respective playback content. A piece of playback content can only be scaled along this route, i.e., one-dimensionally, or the second dimension (orthogonal to this distance) can also be scaled proportionally.

an area within the display area. This specification allows the arbitrary placement of the playback content or its limitation to an area within the specified area, whose own position is also defined within the display area. The playback content can also be scaled to at least one dimension for display, preferably proportional to two orthogonal dimensions, in order to fit into the specified area.

a portion of the display area, in particular corresponding to the product-presentation area located along the screen. This interpretation of the placement data is particularly favourable if the aforementioned video sequences are to be placed along the length of the display area in different sections of the display area.

In principle, the placement data can be generated at any time and can also be used continuously for placement purposes after it has been generated. However, it has been shown to be particularly favourable if the placement data is used for placement of the playback information is placed on the condition that the spatial change in the placement due to the placement data compared to the current placement exceeds a predefined threshold value, in particular, a predefined fixed threshold value or a threshold value that changes dynamically over time and/or the time span until the placement data is taken into account exceeds a temporal threshold value, in particular, a temporal threshold value defined by a customer's typical time spent in front of the video shelving rail.

This aspect of the invention takes into account the fact that an immediate conversion of generated placement data—as mentioned directly through the video shelving rail or through the central control device—is often not desirable at all, because this can lead to a change in the position of the playback content, albeit often only locally small, but high-frequency, which can lead to irritation for the viewer of the video shelving rail. Therefore, it is favourable that a new placement of the playback content determined by the placement data is subject to an evaluation in which it is checked whether a new placement should take place at all.

If, for example, the local difference is too small compared to the previous placement, a new placement can be dispensed with. When assessing whether there is a local difference that needs to be taken into account or not, the dimensions of the product or product group along the video shelving rail can play a role. For example, it can be ensured that minimal local differences, which would be expected in the context of the camera's capture, for example due to changing lighting conditions or shadows and the like, can be faded out (i.e., ignored). On the other hand, major local differences, such as those that can occur when products are already on the shelf are repositioned for example, or also when products are removed from the shelf or also as a result of the refinishing of products on the shelf, are taken into account.

Furthermore, the time span can be taken into account when evaluating whether or not there is a difference to be taken into account. This can be, for example, a fixed threshold value of a few seconds to a few minutes, wherein the detected local change is only taken into account after this temporal threshold value has passed. However, the temporal threshold value preferentially concerns the usual time a customer spends in front of a shelf. This ensures that the change in location is only implemented when it can be assumed that a customer has left the shelf in question or place in question in front of the shelf. This measure can be of great advantage, for example, if a plurality of identical products are placed adjacent to each other and the virtual label is positioned centrally to these products. If a product is removed from the peripheral area of this group of products and a new placement of the virtual label is displayed in relation to the remaining products using the placement data, this re-placement can be postponed until it can be assumed that the customer in question has left the shelf.

In principle, the camera and the image-processing device can be designed separately from each other. This can be favourable, for example, if the most cost-effective cameras are used and, for example, if the digital images obtained with them are forwarded in groups to an image-processing device central to this group of cameras where the placement data is generated. Preferably, however, the camera and the image-processing device are integrated into one device; in particular, the image-processing device is integrated into the camera, and the placement data is transmitted wirelessly directly to the video shelving rail and/or delivered to a higher-level control device, wherein the higher-level control device controls a plurality of, in particular, the entirety of the video shelving rails on business premises with individual playback content. Although this measure requires special camera training, it also creates a much easier infrastructure to install because the number of components to be installed is reduced by the additional image-processing devices that would otherwise be required or their connection to the appropriate camera.

As mentioned above, it is favourable that the method is used using one camera for a plurality of playback content intended for playback on one screen. With the help of a single camera, it is therefore possible to place different playback content per screen.

Furthermore, it is favourable if the method using one camera is used for a plurality of playback content intended for playback with a plurality of screens, in particular installed on shelving rails arranged side by side or on top of each other. This means that a single camera also enables the placement of different playback content for a number of vertically as well as horizontally adjacent screens, i.e., a grouping of the screens into one camera. A camera can also be used to control the placement of the playback content for an entire shelf, where applicable, even for a plurality of shelving rails, as long as the shelf in question is within the camera's detection area.

The screens located in the detection area can clearly identify themselves to the camera or the image-processing device, e.g., by means of a visualized code, so that the assignment of playback content to the screens and the placement data intended for it remain unambiguous.

For example, during an initialization phase of the system or "on demand", i.e., when this is communicated either by the camera itself or by a central server by means of a command to the video shelving rail, the video shelving rail can also display a symbol (particularly for a short time) in order to calibrate the system or the respective camera. This ensures that the camera can make a clear assignment between the display area of each screen and the environment located, in particular, adjacent to it on the shelf, wherein, naturally, the respective perspective of the respective camera is also automatically taken into account. The camera stores the position and extent of the display area of the respective screen in order to incorporate this information into the processing of the digital image by the image-processing device. For example, the symbol displayed for these purposes can be a line that is displayed along the outer edge of the display area, i.e., it indicates the extent of the available display area. Additionally, a barcode or a QR code or an alphanumeric display can also be made with unique identification cards, which are recorded during initialization or calibration and are then available during operation.

Ultimately, it should be mentioned in general terms that the electronic devices described naturally comprise electronics. The electronics can be discrete or constructed by integrated electronics, or also a combination of both. Micro-computers, micro-controllers, application-specific integrated circuits (ASICs), possibly in combination with analogue or digital electronic peripherals, can also be used. Many of the mentioned functionalities of the devices are implemented—possibly in interaction with hardware components—with the aid of software that is executed on an electronics processor. Devices designed for radio communication usually comprise an antenna configuration for transmitting and receiving radio signals as part of a transceiver module. The electronic devices can also have an internal electrical power supply, which can be realized either with a replaceable or rechargeable battery. The devices can also be supplied in a wired manner, either by an external power supply or by means of "Power over LAN" or also by power-transmitting radio signals.

These and other aspects of the invention result from the figures discussed below.

BRIEF DESCRIPTION OF THE FIGURES

The invention is explained in more detail below with reference to the attached figures on the basis of exemplary embodiments, to which, however, the invention is not limited. Thereby, identical components in the various figures are provided with identical reference numbers. The figures schematically show.

DESCRIPTION OF THE EXEMPLARY EMBODIMENTS

Figure 1:
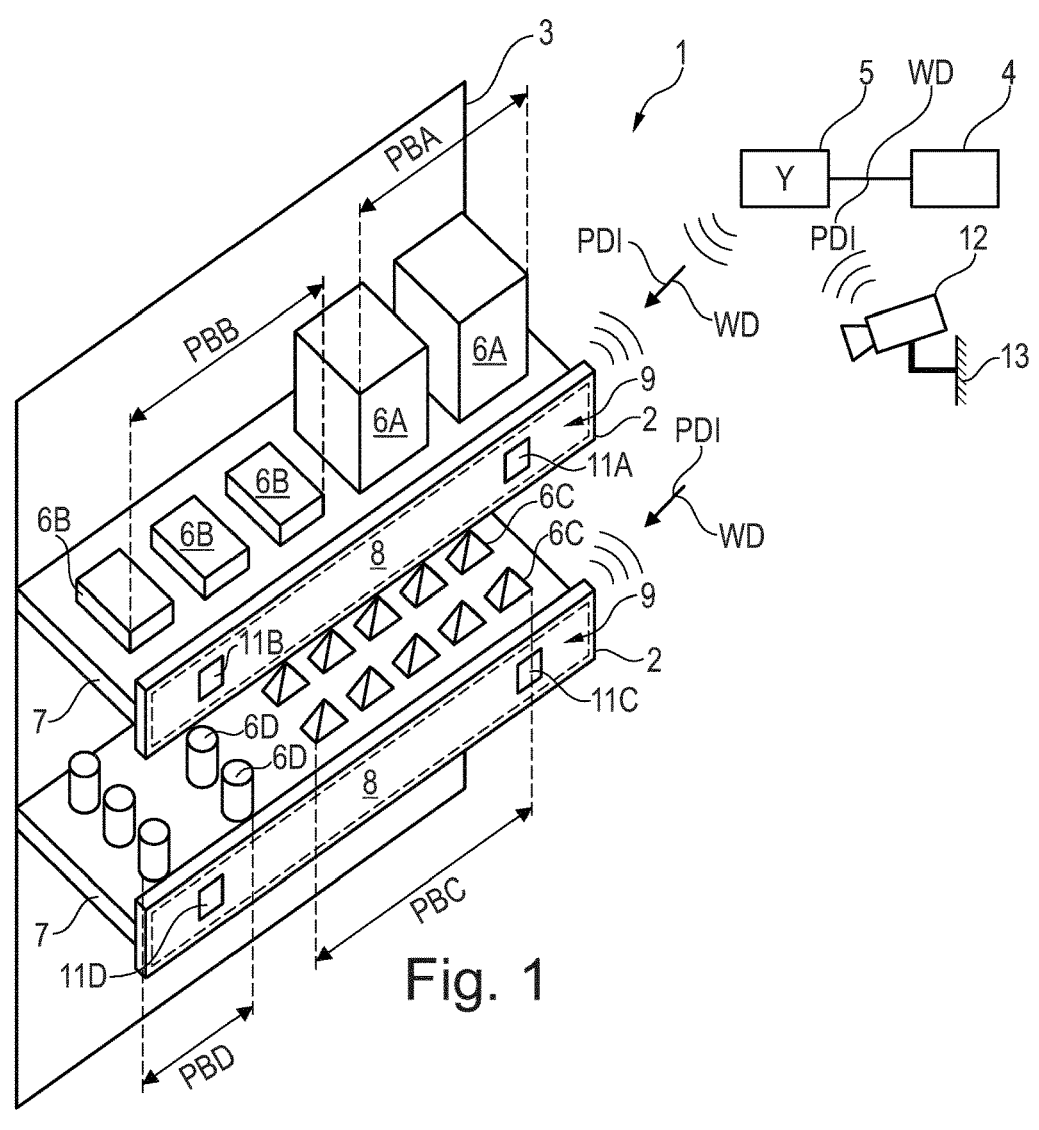
FIG. 1 a section of an ESL system with a shelf attached to video shelving rails showing initially placed virtual ESLs.

FIG. 1 shows an electronic shelf label system 1, hereinafter referred to as the system 1 in short, in which video shelving rails 2 are used. Such a system 1 can be based only on video shelving rails 2 or it can also have a mixed infrastructure of video shelving rails 2, which can be used to display dynamic playback content as well as virtual electronic shelf labels (virtual ESLs), and physical electronic shelf labels (physical ESLs), which usually only display static playback content. Due to the focus of this invention, only one shelf 3 of the system 1 is shown with the equipment necessary for the operation of the video shelving rails 2 installed there.

The system 1 comprises a central server 4 that stores a planogram of the business premises. The planogram is a data structure that represents or maps the positions of products and associated virtual (as well as physical) ESLs, i.e., logically linked to the respective product, as well as their three-dimensional position on the business premises, specifically in the shelving rails and the shelving rails installed there. Each ESL is identifiable by a unique ESL code. The same also applies to the different products or product groups. In the present case, the positions of the video shelving rails are also noted in the planogram, wherein each video shelving rail is also uniquely identifiable by means of a unique video-shelving-rail code.

The server 4 also provides the static and dynamic playback content for display with video shelving rails 2 and physical ESLs, wherein, in this case, only video shelving rails 2 have been discussed.

Playback data WD, which represents the respective playback content, is transmitted by the server 4 with the help of a radio base station 5, referred to as a base station 5 in short, to the respective video shelving rail 2 and stored there. For their part, the video shelving rails 2 each have a common video-shelving-rail radio-communication stage, which is not shown in detail and with the help of which they are integrated into the radio network of bastion 5.

Even if only a single base station 5 is depicted in the present case, in a real installation, a plurality of such base stations 5 are of course installed, distributed on the business premises and the video shelving rails 2 are assigned to such base station 5 in groups for radio communication. In this case, 5 different radio channels of a frequency band are used by spatially adjacent base stations to communicate with the respective group of video shelving rails 2.

The server 4 knows the assignment of the video shelving rails 2 to the base stations 5 and can therefore address the individual video shelving rails 2 in a targeted manner in order to transmit to them the playback content that matches products 6A-6D, which are presented on the respective shelf 7 of the shelf 3, wherein, in order to avoid overloading the figures with reference numbers to identify the products, not all products 6A-6D are marked with reference numbers; however, the different products 6A-6D are clearly identifiable by their special design. The server 4 also transmits initial placement data to PDI, which used the video shelving rails 2 to place or position the playback content within the display area 8 of their (video) screen 9. The display area 8 is bordered by a dashed line, which is supposed to indicate that screen 9 is framed with a slim frame (not identified in an extra fashion). Of course, the frame can also be very slim. The frame can also be dispensed with completely.

In the present case, it is assumed that, as dynamic playback content, a background video showing a panning through a landscape scene was transmitted to video shelving rails 2, which reproduce that background video filling display area 8. Two groups of products are presented side by side on each of the two shelving rails 7, namely products 6A and 6B on the upper shelf 7 and the products 6C and 6D on the upper shelf 7. In the present case, the upper shelf 7 is made up of products used for hiking, such as hiking socks 6B, which are packaged in oblong, rather flat packaging, and hiking boots 6A, which are packaged in rather cubic packaging. The products 6C and 6D presented on the lower shelf 7 also differ, at least for the purposes of this discussion, in the form of their packaging.

In the present case, it is therefore assumed that virtual ESLs 11A-11D, which virtual ESLs 11A-11D represent the respective product and/or price information for the product in question 6A-6D, were transmitted by the server 4 together with initial placement data PDI to the respective video shelving rail 2 as static playback content, according to which each of the video shelving rails 2 displays the respective virtual ESLs 11A-11D in accordance with the information provided by the initial placement data PDI position within display area 8. In the present case, the virtual ESLs 11A-11D are initially positioned on the left and right edges of display area 8, respectively. The respective virtual ESL 11A-11D, which only fills a fraction of the display area, is displayed in front of the background video. This means that the respective background video is covered by the ESL 11A-11D in question.

The system 1 also comprises a camera 12 attached to an unspecified structure 13. This structure 13 can be, for example, a wall, a ceiling, a column or another shelf, etc., from where shelf 3, which can be captured using a camera 12, can be viewed without hindrance.

Figure 2:
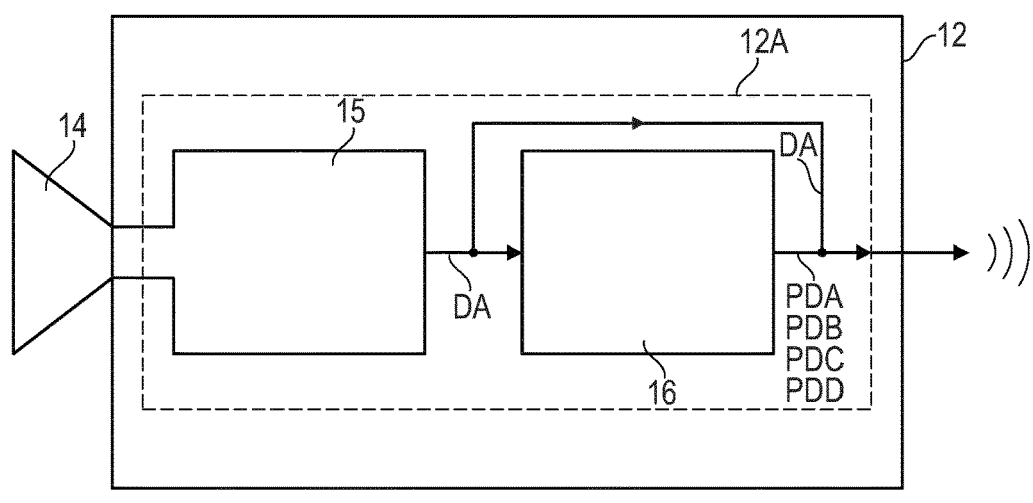
FIG. 2 a camera used in the ESL system.

As shown in FIG. 2, the camera 12 comprises a common lens 14 intended for digital image acquisition and a camera electronics 14A coupled to it, with which at least a first software for the realization of an image capture level 15 is executed, with which a digital image DA of shelf 3 is created with all objects located there, i.e., the products 6A-6D as well as the screens 9 of the video shelving rails 2. The camera electronics 14A are also used to process a second software for the realization of an image-processing device 16, with the help of which a placement indicator and its position are recognized in the digital image. The second software is therefore optimized for pattern recognition in the digital image. In addition, the camera also has a well-known camera-radio communication level, which has been dispensed with. With its help, the camera 12 is integrated into the wireless network of the base station 5 and can communicate with both the server 4 as well as the video shelving rails 2.

In the present case, the different products 6A-6D are directly identified in shelf 3 on the basis of the different packages or their shapes or dimensions or also their markings (or by a combined evaluation of these aspects) by the image recognition device 16 and by determining the area which they occupy in groups along the respective screen 2 or display area 8, a presentation area PBA, PBB, PBC, PBD of the respective group of products 6A-6D is identified. In a further step, the centre of the respective presentation area PBA, PBB, PBC, PBD is determined and this absolute position along the longitudinal extension of the display area 8 (measured, for example, from the left edge of the display area) is generated with the help of individual placement data PDA for the first virtual ESL 11A, PDB for the second virtual ESL 11B, PDC for the third virtual ESL 11C and PDD for the fourth virtual ESL 11D.

As part of the data processing of the image-processing device 16, the respective virtual ESL 11A-11D is also automatically recorded and thus the relevant ESL 11A-11D is uniquely identified. This unique identification can be done either by evaluating the product and/or price information of the respective virtual ESL 11A-11D or by recognizing a unique identification code displayed with the help of the respective ESL 11A-11D or by determining the position of the respective ESL 11A-11D within the display area 8 of the respective screen 8. In any event, the video shelving rail 2 in question is aware of at least one of the three parameters necessary for the unambiguous identification of the virtual ESL 11A to 11D in question, because the video shelving rail 2 stores the product and/or price information for the virtual ESL 11A-11D in question and/or stores the identification code of the ESL 11A-11D in question and/or in any case also the position of the relevant ESL 11A-11D; on which it covers the video.

The placement data generated for the respective virtual ESL 11A-11D PDA-PDD is subsequently transferred from camera 12, which is also integrated into the wireless network of base station 5, to the respective video shelving rail 2 and used there to place the respective virtual ESL 11A-11D. Thus, the position of the virtual ESLs 11A-11D is changed by the controlling effect of the placement data PDA-PDD in such a way that each virtual ESL 11A-11D is now centrally placed to the respective presentation area PBA-PBD.

At this point, it should be mentioned that the camera 12 can be configured in such a way that, in addition to the placement data PDA-PDD, it can also output the data that represents the digital image DA as such, i.e., the raw data or already pre-processed raw data of the image acquisition.

Figure 3:
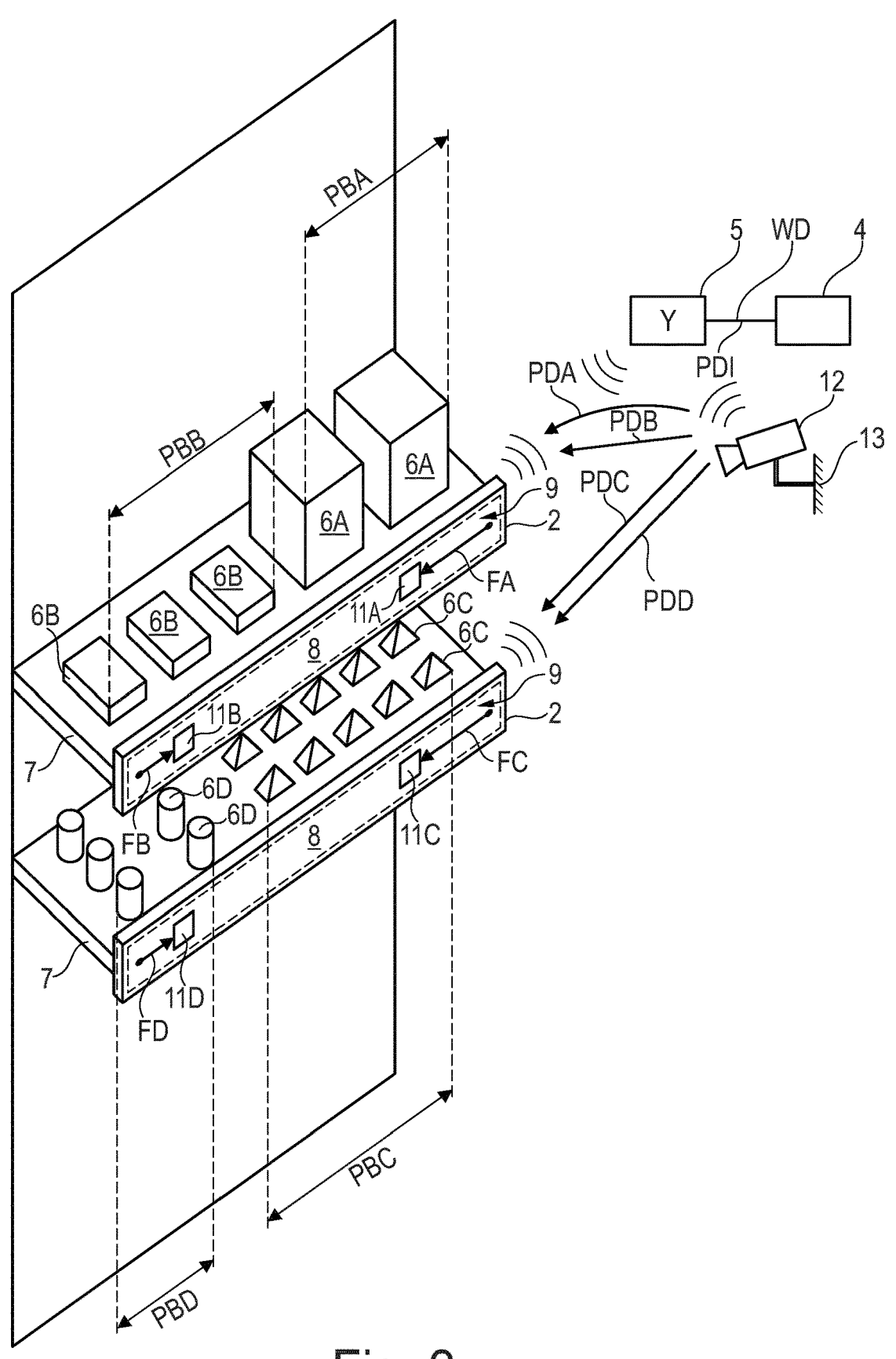
FIG. 3 an automatic change in the placement of the virtual ESLs in accordance with a first exemplary embodiment of the invention.

The new positioning of the virtual ESLs 11A-11D is shown in FIG. 3, wherein the arrows FA-FD indicate the movement of the position of the respective virtual ESL 11A-11D along the longitudinal extension of the respective video shelving rail 2 or its display area 8 of screen 9 in comparison to the respective starting position due to the respective placement data PDA-PDD, as shown in FIG. 1.

Analogously, an automatic distribution of the available display width can also be made for four different background videos, which form a dynamic playback content, wherein, here again, the ratios in accordance with FIG. 1 have been discussed.

Initially, the four background videos, e.g., per shelf 7, are planned or displayed with a 50%/50% division along the display area. If the image-processing device detects that on the upper shelf 7 the first products 6A occupy only 40% and the second products 6B 60% of the longitudinal extension of screen 9 or its display area 8, corresponding first and second placement data PDA, PDB are generated, which, in the case of the upper video shelving rail 2, define a video playback width of 40% for the background video belonging to the first product 6A and a playback rate of 60% for the background video belonging to the second product 6B appropriate background video. The two background videos are scaled accordingly and subsequently displayed to match the PBA and PBB presentation area. It can also be provided that a section of the respective overall video image of the respective background video is displayed there that matches the respective product-presentation area PBA or PBB in order to avoid unnatural distortions that can arise from non-proportional scaling of the width and height of the video image.

The same also applies to the lower video shelving rail 2, in which the third product 6C occupies approx. 70% and the fourth product 6D approx. 30% of the longitudinal extension of the display area 8. The image-processing device 16 programs the lower video shelving rail 2 accordingly to display the third background video with 70% of the longitudinal extension of the display area 8 corresponding to the third presentation area PBC and the fourth background video with 30% of the longitudinal extension of display area 8 corresponding to the fourth presentation area PBD.

Figure 4:
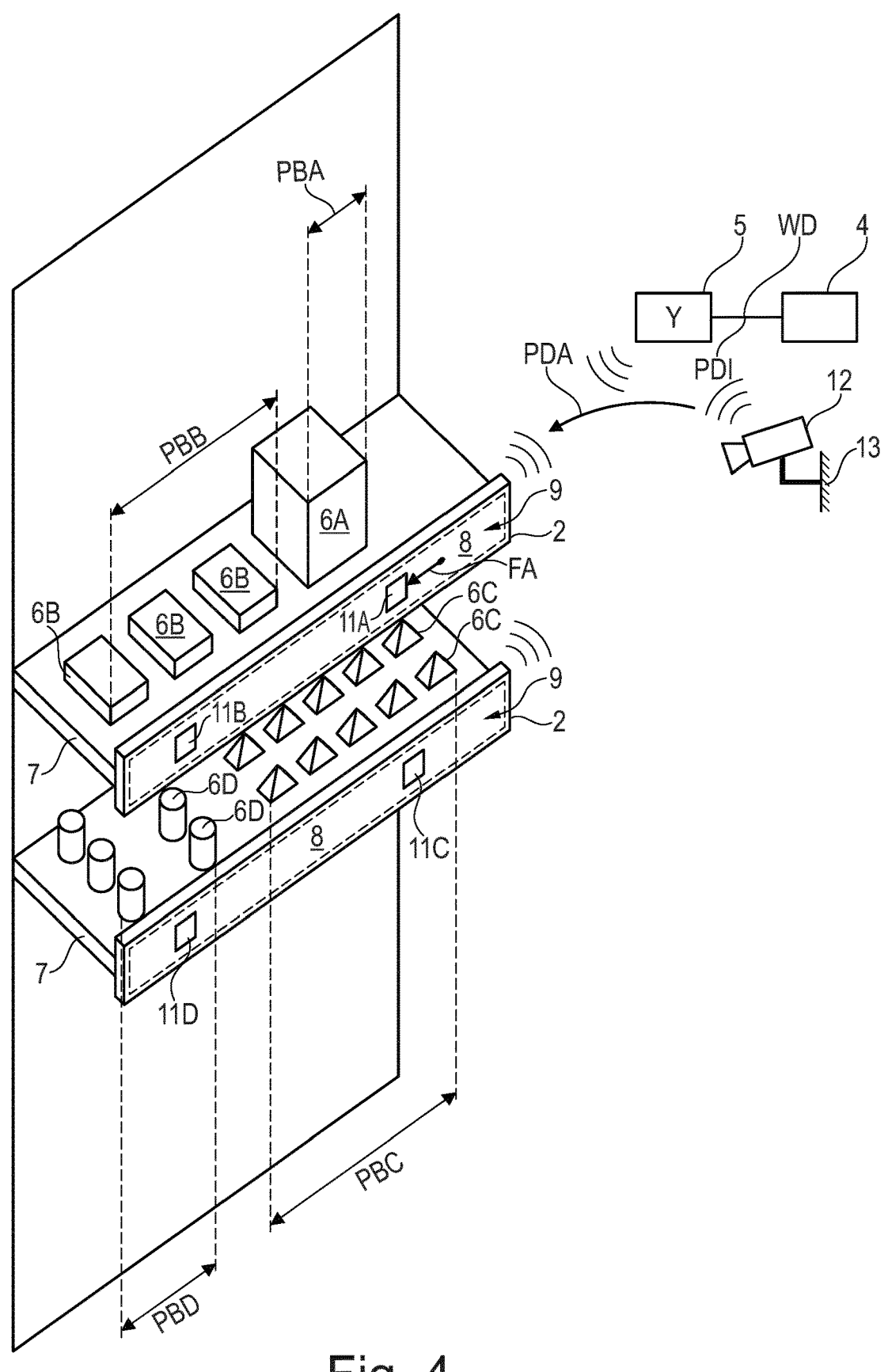
FIG. 4 a further automatic change in the placement due to a product being taken.

Subsequently, it can happen that, as shown in FIG. 4 with reference to the upper shelf 7, the product-presentation area PBA changes as a result of product removal, specifically for product 6A, the product-presentation area PBA is approximately halved in terms of its longitudinal dimensions along the display area 8 and its centre has been shifted to the left because the right product 6A of the two products 6A-6B has been removed from the upper shelf 7. This change is detected by the image-processing device 16 of the camera 12 and new placement data is generated for the first virtual ESL 11A PDA, which is transmitted to the upper video shelving rail 2 and there causes a re-placement of the first virtual ESL 11A centrally to the last remaining product 6A. This is indicated by the arrow FA, which indicates the movement of the first virtual ESL 11A compared to a position shown in FIG. 3.

Figure 5:
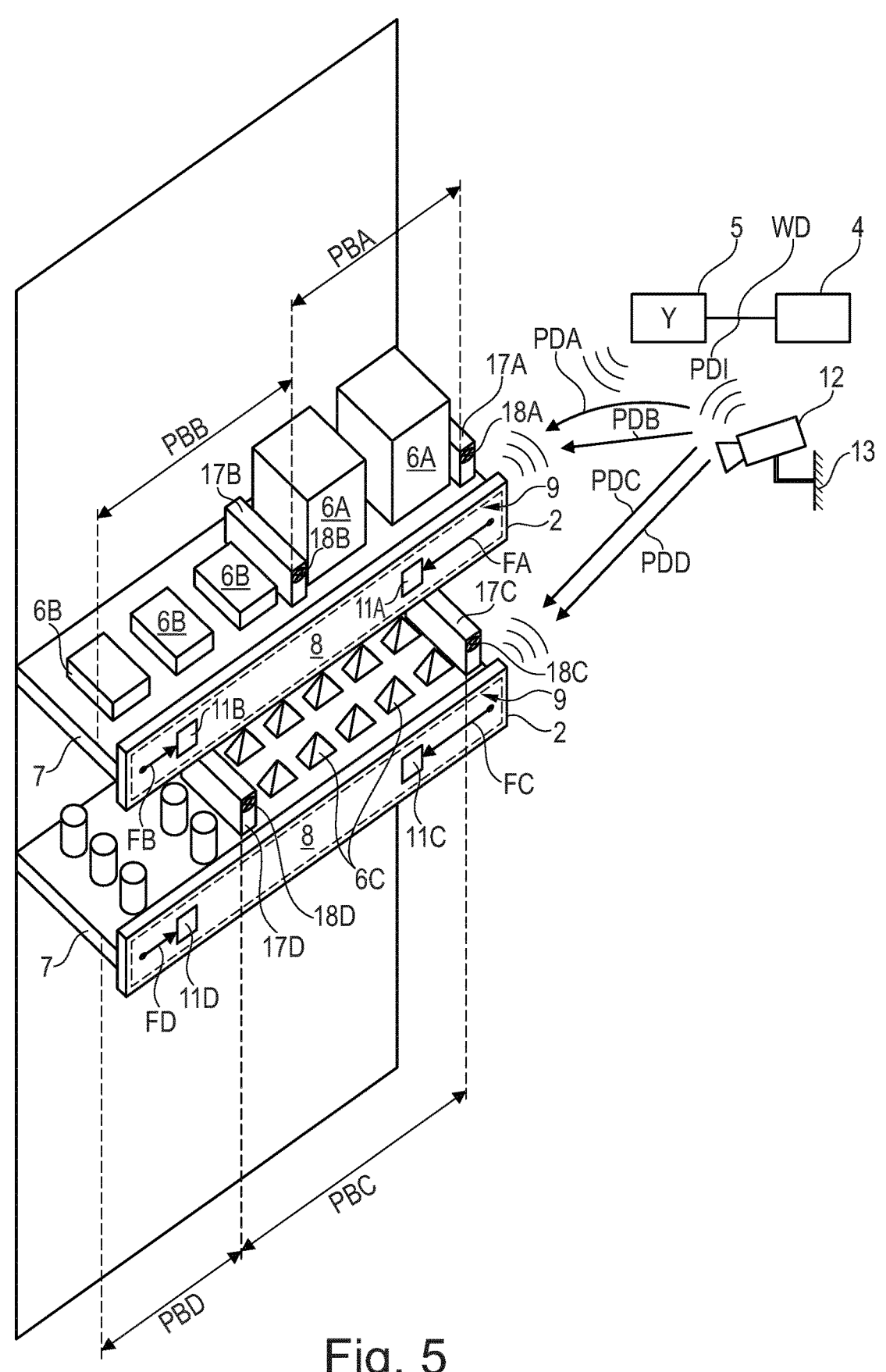
FIG. 5 an automatic change in the placement of the virtual ESLs in accordance with another exemplary embodiment of the invention.

In accordance with a further embodiment type of the invention, the positioning of the products 6A-6D, possibly also of the presentation areas assigned to them PBA-PBD, can be indicated by so-called shelf dividers 17A to 17D, which are shown in FIG. 5 and which, in contrast to FIG. 1, where the products 11A-11D themselves formed the placement indicators, in this case, they now form the placement indicators, which are automatically detected by image-processing device 16.

Due to their special shape, which makes them clearly distinguishable from the products, the shelf dividers 17A-17D can be identified in the digital image DA by the image-processing device 16. Preferably, however, the shelf dividers have a shelf divider electronics (not shown), which is also designed for radio communication in the radio network of base station 5. During the course of such radio communication, identification data is transmitted to the respective shelf divider 17A-17D for the unambiguous identification of the product 6A-6D placed adjacent to it. The electronics of the 17A-17D shelf dividers also comprise an LED 18A-18D visible on the outside of the front or top side of the housing or a light guide that is coupled with the LED 18A-18D installed inside the housing. With the help of the LED 18A to 18D, the shelf-divider electronics of the respective shelf divider 17A-17D emit a variable (modulated or flashing) light signal, which is also used to transmit the unique identification data as information content. With the help of the individual light signal, the individual shelf dividers 17A-17D are recognized by the imaging processing device 16 as a placement indicator and also their position.

By definition, in accordance with this example, the shelf dividers 17A-17D are to be placed to the right of the respective product 6A-6D, as shown in FIG. 5. The first product-presentation area PBA stretches between the adjacent shelf dividers 17A and 17B. The third product-presentation area PBC stretches between the adjacent shelf dividers 17C and 17D. To the left of the second shelf divider 17B to the end of the upper shelf 7 or also the upper video shelving rail 2 is the second product-presentation area PBB. To the left of the fourth shelf divider 17D to the end of the lower shelf 7 or also the lower video shelving rail 2 is the fourth product-presentation area PBD. Of course, a final shelf divider (not shown) can also be provided on the left side of each shelf 7, which emits a neutral light signal and is simply used to demarcate the presentation areas PBB and PBD.

Based on this, the image-processing device 16 can generate the placement data for the virtual ESLs 11A to 11D and transmit them wirelessly to the video shelving rail 2, where the re-placement of the virtual ESLs 11A-11D is carried out analogously to FIG. 3.

The previously discussed placement of the background videos can also be achieved in an analogue way with the help of the 17A-17D shelf dividers.

Often, active light-emitting placement indicators are easier for the image-processing device 16 to detect than is the case when the products themselves are used as a placement indicator. This reduces the error rate and significantly accelerates the detection and identification process. Therefore, the use of other actively emitting objects can also be used as placement indicators. They only need to be suitable for indicating or limiting the space of a product to be presented along the screen.

Finally, it is pointed out once again that the figures described in detail above are only exemplary embodiments, which can be modified by the person skilled in the art in various ways without leaving the field of the invention. For the sake of completeness, it is also pointed out that the use of the indefinite article "a" does not exclude that the respective features can also be present a multiple of times.

The invention claimed is:

1. A method of placing a playback content within the display area of a screen of a video shelving rail,
   wherein, with the help of a camera, a digital image of the screen and/or
   a product-presentation area extending along the screen is captured, and
   wherein an image-processing device is used to automatically detect a placement indicator and its position in the digital image, wherein the placement indicator indicates or delimits the space of a product to be presented along the screen, and
   wherein the image-processing device generates placement data based on the detected position of the placement indicator, wherein the placement data defines the space for the playback content to be played within the display area, and
   wherein the video shelving rail displays the playback content in accordance with the placement data within the display area of the screen,
   wherein the placement data are used only on condition for the placement of the playback content that:
   the spatial change in the placement due to the placement data compared to the current placement exceeds a predefined fixed threshold value or a threshold value that changes dynamically over time
   and/or
   the time span until the placement data is taken into account exceeds a temporal threshold value.

2. The method according to claim 1, wherein the automatic detection of the placement indicator is carried out using computerized image content and/or pattern recognition.

3. The method according to claim 1, wherein an optical signal is detected as the placement indicator.

4. The method according to claim 3, wherein the optical signal is formed by a temporally and/or spatially varying signal.

5. The method according to claim 3, wherein the optical signal is emitted by the screen.

6. The method according to claim 3, wherein the optical signal is emitted by a shelf divider located in the product-presentation area.

7. The method according to claim 3, wherein the optical signal is a light signal in a spectral range not visible to humans.

8. The method according to claim 1, wherein the placement indicator is identified as the product or a group of products located in the product-presentation area.

9. The method according to claim 1, wherein the placement data is transferred from the image-processing device to a higher-level control device, wherein the control device controls the placement of the playback content in accordance with the placement data within the display area of the screen of the video shelving rail.

10. The method according to claim 9, wherein the placement data describe or represent a placement in the display area in at least one of the following ways, namely:

a single coordinate to define a position in the display area along a direction, a pair of coordinates to define the position of a point in the display area, a route within the display area, an area within the display area, a portion of the display area.

11. The method according to claim 9, wherein the control device controls the placement of the playback content in accordance with the placement data within the display area of the screen of the video shelving rail individually for a plurality of such video shelving rails.

12. The method according to claim 9, wherein the placement data describe or represent a placement in the display area in at least one of the following ways, namely:

a single coordinate to define a position in the display area along a direction, a pair of coordinates to define the position of a point in the display area, a route within the display area, an area within the display area, a portion of the display area corresponding to the product-presentation area located along the screen.

13. The method according to claim 1, wherein the placement data is delivered from the image-processing device directly to the video shelving rail from which the digital image was captured, wherein the video shelving rail controls the placement of the playback content in accordance with the placement data within the display area of the screen of the video shelving rail.

14. The method according to claim 1, wherein the placement data are used only on condition for the placement of the playback content that:

the spatial change in the placement due to the placement data compared to the current placement exceeds the predefined fixed threshold value or the threshold value that changes dynamically over time and/or the time span until the placement data is taken into account exceeds the temporal threshold value, wherein the temporal threshold value is defined by a customer's typical time spent in front of the video shelving rail.

15. The method according to claim 1, wherein the camera and the image-processing device are integrated into one device, and the placement data are transmitted by radio directly to the video shelving rail and/or are delivered to a higher-level control device, wherein the higher-level control device controls a plurality of the video shelving rails with individual playback content.

16. The method according to claim 15, wherein the image-processing device is integrated into the camera, and wherein the higher-level control device controls an entirety of the video shelving rails on business premises with individual playback content.

17. The method according to claim 1, wherein the method using one camera is used for a plurality of playback content intended for playback using one screen.

18. The method according to claim 1, wherein the method using one camera is applied to a plurality of playback content intended for playback with a plurality of screens.

19. The method according to claim 1, wherein the method using one camera is applied to a plurality of playback content intended for playback with a plurality of screens installed on shelving rails arranged side by side or on top of each other.

20. A method of placing a playback content within the display area of a screen of a video shelving rail, wherein an optical signal is transmitted at a position visible to a camera, wherein, with the help of the camera:

a digital image of the optical signal and the screen is captured, and/or a digital image of the optical signal and a product-presentation area extending along the screen is captured, and wherein an image-processing device is used to automatically detect the optical signal and its position in the digital image, wherein the optical signal indicates or delimits the space of a product to be presented along the screen, and wherein the image-processing device generates placement data based on the detected position of the optical signal, wherein the placement data defines the space for the playback content to be played within the display area, wherein the video shelving rail displays the playback content in accordance with the placement data within the display area of the screen.

21. The method according to claim 20, wherein the optical signal is a light signal in a spectral range not visible to humans.

* * * * *